United States Patent [19]
Sonderegger

[11] Patent Number: 5,638,241
[45] Date of Patent: Jun. 10, 1997

[54] DISK CARTRIDGE HAVING HEAD LOADING/UNLOADING RAMPS

[75] Inventor: Ralph L. Sonderegger, Farmington, Utah

[73] Assignee: Iomega Corporation, Roy, Utah

[21] Appl. No.: 468,371

[22] Filed: Jun. 6, 1995

[51] Int. Cl.$^6$ .................................................. G11B 23/03
[52] U.S. Cl. .......................................................... 360/133
[58] Field of Search .............................. 360/133; 369/291

[56] References Cited

U.S. PATENT DOCUMENTS

| | | | |
|---|---|---|---|
| 4,051,735 | 10/1977 | Johnson et al. | 74/25 |
| 4,504,879 | 3/1985 | Toldi et al. | 360/105 |
| 4,663,677 | 5/1987 | Griffith et al. | 360/71 |
| 4,663,686 | 5/1987 | Freeman et al. | 360/128 |
| 4,683,506 | 7/1987 | Toldi et al. | 360/105 |
| 4,740,851 | 4/1988 | Jones et al. | 360/97 |
| 4,772,012 | 9/1988 | Toldi et al. | 360/97 |
| 4,787,000 | 11/1988 | Schulze | 360/105 |
| 4,811,143 | 3/1989 | Ohashi et al. | 360/105 |
| 4,823,219 | 4/1989 | Ueda et al. | 360/106 |
| 4,901,173 | 2/1990 | Jones et al. | 360/99.04 |
| 4,965,685 | 10/1990 | Thompson et al. | 360/97.01 |
| 4,965,691 | 10/1990 | Iftikar et al. | 360/133 |
| 4,974,103 | 11/1990 | Iftikar et al. | 360/97.01 |
| 5,027,241 | 6/1991 | Hatch et al. | 360/105 |
| 5,136,446 | 8/1992 | Yamamoto et al. | 360/106 |
| 5,175,657 | 12/1992 | Iftikar et al. | 360/98.01 |
| 5,237,477 | 8/1993 | Hodapp et al. | 360/128 |
| 5,267,227 | 11/1993 | Nanke | 369/77.1 |
| 5,317,464 | 5/1994 | Witt et al. | 360/99.08 |

FOREIGN PATENT DOCUMENTS

WO93/18507  9/1993  WIPO.

OTHER PUBLICATIONS

Godwin, J., "An Introduction to the Insite 325 FLOPTICAL® Disk Drive", presented at SPIE Optical Data Storage Topical Meeting, 1989.

*Primary Examiner*—Robert S. Tupper
*Attorney, Agent, or Firm*—Woodcock Washburn Kurtz Mackiewicz & Norris

[57] ABSTRACT

A disk cartridge comprises a disk-shaped storage medium and an outer casing that houses the storage medium. The outer casing has a head access opening for providing access by the read/write heads of a disk drive to the disk-shaped storage medium within the casing. Head loading/unloading ramps are provided in the cartridge proximate the head access opening for loading and unloading the read/write heads of the disk drive to and from the storage medium.

4 Claims, 2 Drawing Sheets

DISK CARTRIDGE HAVING HEAD LOADING/UNLOADING RAMPS

RELATED APPLICATIONS

This application is related to co-pending application Ser. No. 08/324,895, filed Oct. 18, 1994, entitled "Head Load/Unload and Cleaning in a Data Storage Device".

BACKGROUND

1. Field of the Invention

The present invention relates to disk cartridges for storing digital information, and more particularly, to a disk cartridge having head loading/unloading ramps within the cartridge to facilitate the loading and unloading of read/write heads onto a storage medium within the cartridge.

2. Description of the Prior Art

Removable disk cartridges for storing digital electronic information typically comprise an outer casing or shell that houses a disk-shaped magnetic, magneto-optical or optical storage medium upon which information can be stored. The cartridge shell often comprises upper and lower halves that are joined together to house the disk. The disk is mounted on a hub that rotates freely within the cartridge. When the cartridge is inserted into a disk drive, a spindle motor in the drive engages the disk hub in order to rotate the disk within the cartridge at a given speed. The outer shell of the cartridge typically has an opening near one edge to provide the recording heads of the drive with access to the disk. A shutter or door mechanism is often provided to cover the head access opening when the cartridge is not in use to prevent dust or other contaminants from entering the cartridge and settling on the recording surface of the disk.

Disk drives for use with such removable disk cartridges typically employ either a linear actuator mechanism or a radial arm actuator mechanism for positioning the read/write head(s) of the disk drive on the recording surface(s) of the storage medium, or disk. Because the disk cartridges are designed to be removable from the drive, the linear or radial arm actuators must be able to move off, and away from, the storage medium to a retracted position in order to prevent damage to the head(s) when a cartridge is inserted and removed from the disk drive.

Many removable cartridge disk drives employ a pair of opposing read/write heads for recording and reproducing information on both sides of a storage medium. Typically, the opposing heads are disposed on flexible suspension arms at the distal end of an actuator that allow the heads to fly closely over the respective surfaces of the rotating disk. The opposing heads must be spread apart as they approach the edge of the disk during a head loading operation in order to avoid collision with the edge of the disk. Similarly, when the heads are unloaded from the disk, they must again be spread apart to avoid collision with the edge of the disk and each other.

A mechanism for controlling the loading and unloading of heads in connection with a linear actuator mechanism is disclosed in commonly assigned, co-pending patent application Ser. No. 08/324,895, filed Oct. 18, 1994, entitled "Head Load/Unload and Cleaning in a Data Storage Device". As disclosed therein, wings are attached to the heads that act as lifters to control the vertical position of the heads. The wings are in close proximity to the heads to fully ensure that the motion of the wing is the motion of the heads. The wings ride on opposed ramps fixedly disposed in the drive as the carriage of the linear actuator moves toward and away from the disk.

U.S. Pat. No. 4,965,685 (Thompson et al.) discloses a head loading mechanism for use with a radial arm voice coil actuator. The radial arm actuator comprises a bifurcated actuator arm that has upper and lower suspension arms mounted at its distal end. Magnetic heads are mounted on the ends of the respective suspension arms. The head loading mechanism of Thompson et al. comprises an elongate head load arm that is pivotally mounted within the disk drive. Ramped prongs are formed at the distal end of the head load arm. When the disk drive is not in use, the suspension arms are separated by, and rest upon, the ramped prongs. When a disk cartridge is inserted into the disk drive, the actuator arm moves toward the disk cartridge causing the suspension arms to move down the ramped prongs and onto the recording surfaces of the storage medium.

U.S. Pat. No. 4,683,506 (Toldi et al.) discloses yet another mechanism for separating a pair of opposing read/write heads during cartridge insertion and for subsequently bringing the heads together onto the surface of a storage medium. Like other prior art mechanisms, this mechanism is also mounted in the disk drive.

Because the head loading/unloading mechanisms of the prior art are mounted in their respective disk drives, they must be designed to account for the relatively loose tolerances on the positioning of a disk cartridge within the disk drive. The vertical displacement of the read/write heads during head loading operations must be sufficiently large to accommodate worst case vertical positioning of a disk cartridge within the drive. Unfortunately, such large vertical displacement of the read/write heads adversely affects other tolerances in the disk cartridge and disk drive, and the increased vertical travel of the read/write heads affects the speed of the head loading operation. Accordingly, there is a need for a more efficient head loading/unloading mechanism that provides more accurate and controlled positioning of the read/write heads relative to the storage medium within a disk cartridge. The present invention satisfies this need.

SUMMARY OF THE INVENTION

The present invention is directed to a disk cartridge comprising a disk-shaped storage medium and an outer casing that houses the storage medium. The outer casing has a head access opening for providing access by the read/write heads of a disk drive to the disk-shaped storage medium within the casing. Head loading/unloading ramps are provided in the cartridge proximate the head access opening for loading and unloading the read/write heads of the disk drive to and from the storage medium. In a preferred embodiment, the head loading/unloading ramps comprise first opposed ramps that separate the read/write heads as they approach the storage medium within the casing, and second opposed ramps that bring the heads together for loading onto the storage medium in a controlled manner. Placement of the ramps within the cartridge allows the movement of the read/write heads to be more accurately controlled in relation to the vertical position of the storage medium.

The foregoing and other objects, features and advantages of the invention will become evident hereinafter.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE INVENTION

Figure 1:
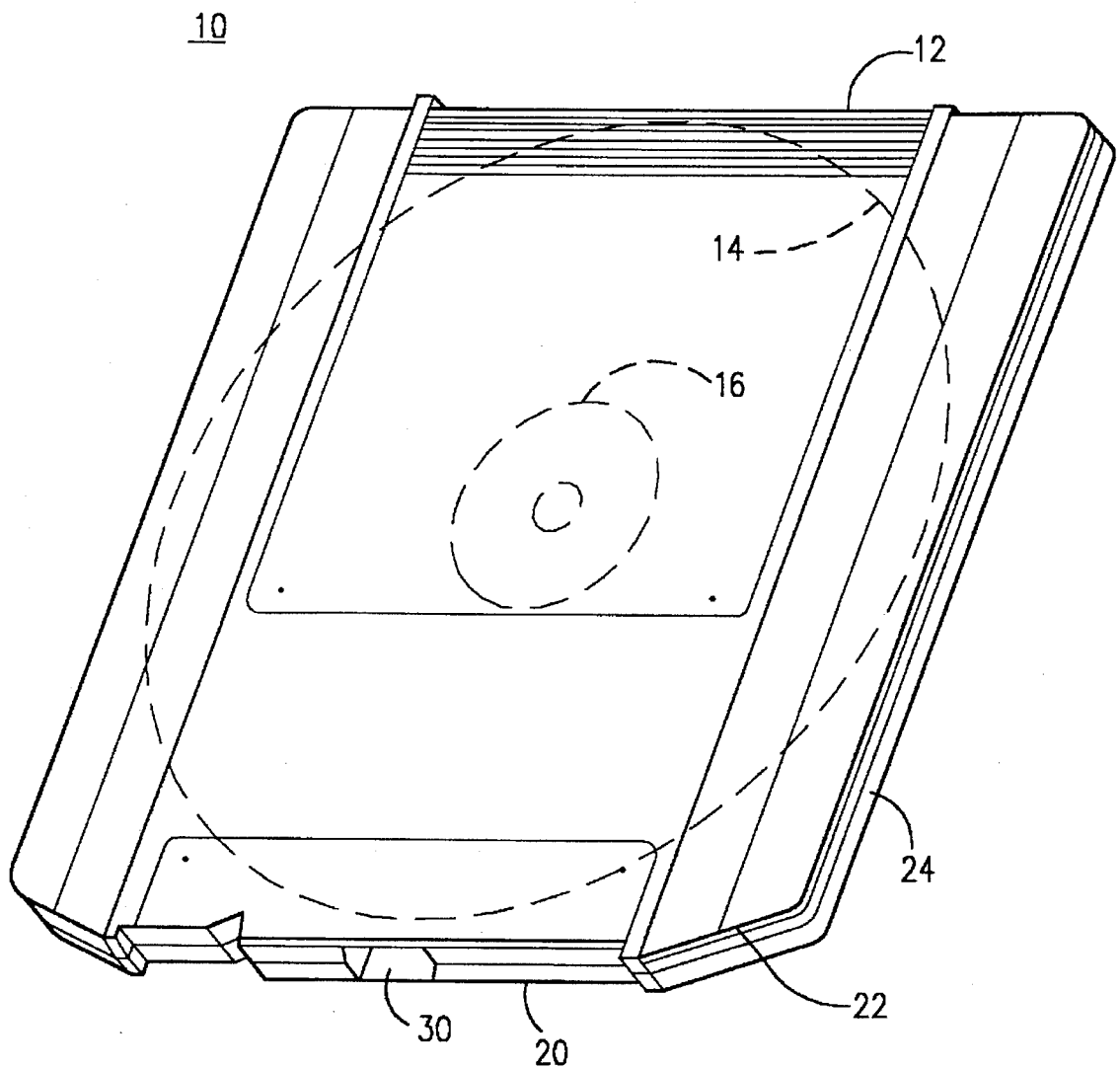
FIG. 1 is a perspective view of a disk cartridge in accordance with the present invention.

Referring to the drawings wherein like numerals indicate like elements throughout, there is shown in FIG. 1 a disk cartridge 10 in accordance with a preferred embodiment of the present invention. As shown, the disk cartridge 10 comprises an outer casing 12 having upper and lower shells 22, 24 that mate to form the casing. A disk-shaped storage medium 14 is rotatably mounted on a hub 16 within the casing 12. An opening (not shown) in the bottom shell 24 of the casing 12 provides access to the disk hub 16 in a conventional manner. A head access opening 30 in the front peripheral edge 20 of the disk cartridge 10 provides access to the surfaces of the storage medium 14 by the read/write heads of a disk drive. A shutter (not shown) can be provided on the front peripheral edge 20 of the disk cartridge 10 to cover the head access opening 30 in a conventional manner, when the cartridge is not in use. In the present embodiment, the disk-shaped storage medium comprises a flexible, or floppy, magnetic disk, however, the invention is by no means limited thereto. In other embodiments, for example, the disk-shaped storage medium may comprise a rigid magnetic disk, a magneto-optical disk or an optical storage medium.

Figure 2:
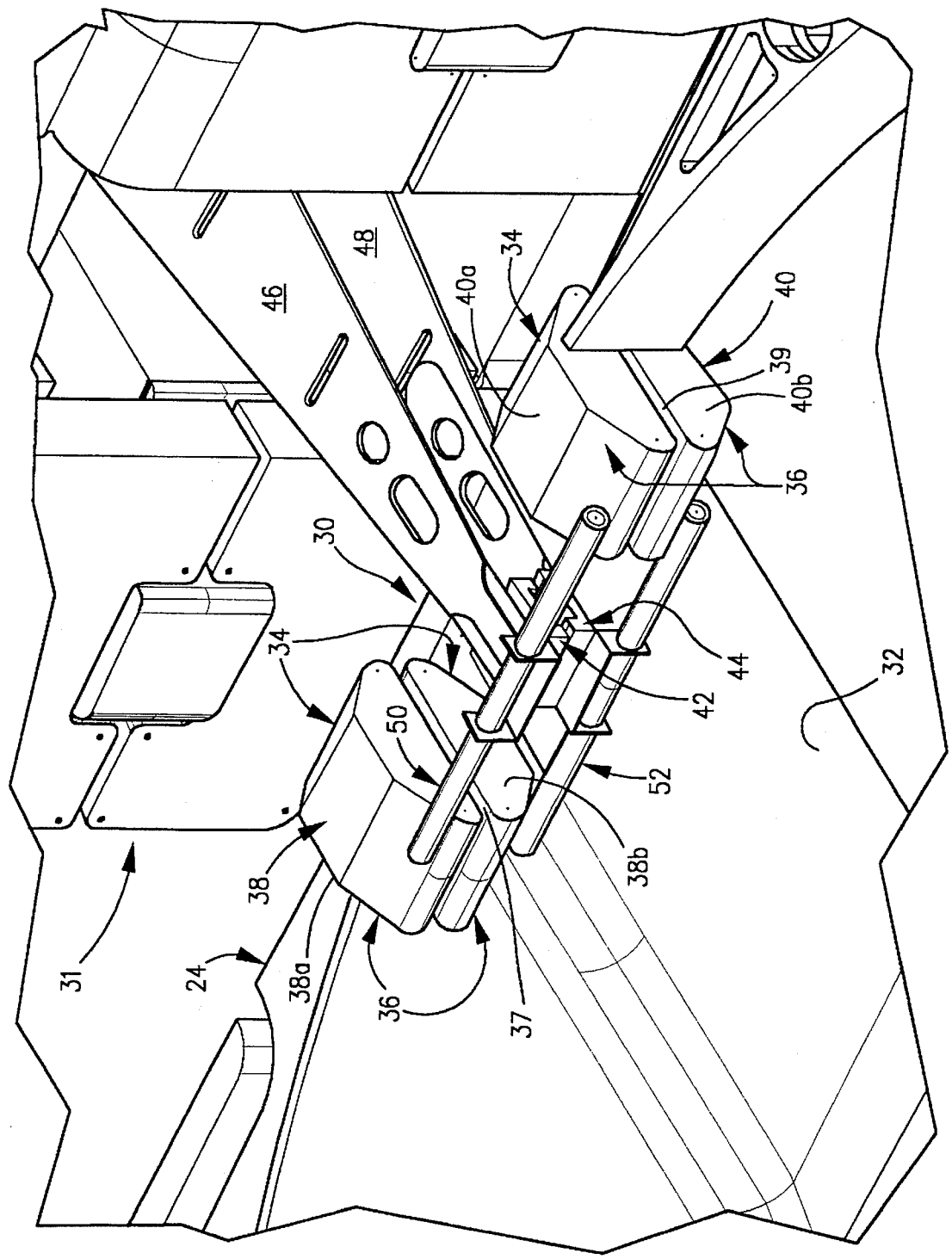
FIG. 2 is a perspective view of the bottom shell of the disk cartridge of FIG. 1 showing the placement of head loading/ unloading ramps within the cartridge in accordance with the present invention.

FIG. 2 is a perspective view illustrating the interaction of the disk cartridge 10 of FIG. 1 with an exemplary linear actuator 31 of a disk drive into which the cartridge 10 can be inserted. For convenience of illustrating the present invention, the upper shell 22 and disk-shaped storage medium 14 of the disk cartridge 10 are omitted in FIG. 2. An exemplary disk drive that incorporates a linear actuator of the type shown in FIG. 2 is described in greater detail in co-pending U.S. patent application Ser. No. 08/324,599, filed Oct. 18, 1994, entitled "Actuator for Data Storage Device", and in co-pending U.S. patent application Ser. No. 08/398,576, filed Mar. 3, 1995, entitled "Movable Internal Platform for a Disk Drive", both of which are incorporated herein by reference in their entirety.

As shown, the bottom shell 24 of the disk cartridge has an elongate groove 32 that forms a channel with a corresponding groove (not shown) in the upper shell for receiving a pair of opposing read/write heads 42, 44 mounted on respective suspension arms 46, 48 of the exemplary linear actuator. The suspension arms 46, 48 enter the cartridge 10 through the head access opening 30. According to the present invention, head loading/unloading ramps are provided within the cartridge 10 to guide the opposing read/write heads 42, 44 onto and away from the respective, opposite surfaces of the storage medium (not shown) during head loading and unloading operations. In the present embodiment, the head loading/unloading ramps comprise first and second opposed ramps 34 and 36, respectively.

As further shown in FIG. 2, the first and second suspension arms 46, 48 of the exemplary linear actuator have respective wing members 50, 52 attached thereto, which in the preferred embodiment, comprise elongate rods. It is understood, however, that the wing members 50, 52 could take any form and are by no means limited to the elongate rod structures shown. As described below, these wing members 50, 52 ride on the first and second opposed ramps 34, 36 of the present invention in order to guide the read/write heads 42, 44 onto and away from the respective surfaces of the storage medium during head loading and unloading operations.

In use, as the read/write heads 42, 44 of the linear actuator enter the head access opening 30 and approach the edge of the storage medium (not shown), the wing members 50, 52 on the respective suspension arms 46, 48 ride up the first opposed ramps 34, causing the heads 42, 44 to separate so that they can pass on both sides of the storage medium. Further travel of the suspension arms 46, 48 causes the wing members 50, 52 to ride down the second opposed ramps 36, bringing the heads 42, 44 onto the respective surfaces of the storage medium in a controlled manner.

Upon withdrawal of the suspension arms 46, 48 from the disk cartridge, the wing members 50, 52 will ride back up the second opposed ramps 36 to again separate the heads 42, 44. Further retraction of the suspension arms 46, 48 moves the heads 42, 44 away from the storage medium and back down the first opposed ramps 34. As the wing members 50, 52 ride down the first opposed ramps 34 and begin to move back out of the disk cartridge 10, the read/write heads 42, 44 are preferably brought together onto a cleaning medium (not shown) which cleans the heads while they are out of contact with the storage medium. Such a cleaning technique is described in co-pending U.S. patent application Ser. No. 08/324,895, filed Oct. 18, 1994, entitled "Head Load/Unload and Cleaning in a Data Storage Device," which is incorporated herein by reference in its entirety.

In the preferred embodiment, the first and second opposing ramps are defined by first and second ramp members 38, 40 that are disposed near the head access opening 30 of the disk cartridge on opposite sides of the head access channel 32. Each ramp member 38, 40 has an upper portion 38a, 40a and a lower portion 38b, 40b separated by a respective spacing 37, 39. The respective spacings 37, 39 receive the outer edge of the rotating storage medium (not shown).

The read/write heads 42, 44 pass through the space between the respective ramp members 38, 40, while the wing members 50, 52 ride over the respective ramped surfaces 34, 36. The ramp members 38, 40 can be formed separately from the outer casing 12 of the cartridge 10 and then mounted within the cartridge 10 to either of the upper or lower shells 22, 24. Alternatively, the first and second ramp members 38, 40 can be formed integrally with either the top or bottom shells 22, 24. In the present embodiment, the ramp members 38, 40 are formed of plastic, although any suitable material can be employed. In an alternative embodiment, a single ramp member can be employed on only one side of the channel 32. However, two ramp members 38, 40 are preferable to add stability to the head loading/unloading operation.

As the foregoing illustrates, the present invention is directed to a disk cartridge having head loading/unloading ramps disposed within the cartridge, as opposed to the prior art technique of mounting such ramps in the disk drive. Placement of the ramps within the cartridge allows the movement of the read/write heads to be more accurately controlled in relation to the vertical position of the storage medium. It is understood that changes may be made to the embodiments described above without departing from the broad inventive concepts thereof. For example, while the present invention is disclosed above in connection with a linear actuator mechanism, the present invention could also be employed in connection with a radial arm actuator. Accordingly, the present invention is not limited to the particular embodiments disclosed, but is intended to cover all modifications that are within the spirit and scope of the invention as defined by the appended claims.

What is claimed is:

1. A disk cartridge comprising:

a disk-shaped storage medium;

an outer casing that houses said storage medium, said outer casing having a head access opening for providing access to the disk-shaped storage medium within the casing; and head loading/unloading ramps connected to the disk cartridge within said outer casing proximate the head access opening thereof for loading and unloading a pair of opposing read/write heads of a disk drive to and from the storage medium.

2. The disk cartridge recited in claim 1 wherein said head loading/unloading ramps comprise:

first opposed ramps upon which said read/write heads ride to separate said read/write heads as said heads approach the storage medium within said casing; and second opposed ramps upon which said read/write heads ride to bring said heads together for loading onto said storage medium.

3. The disk cartridge recited in claim 2 wherein said first and second opposed ramps are positioned within said cartridge so as to engage respective wing members attached to said opposing read/write heads, the wing members of said read/write heads riding along said first and second opposed ramps.

4. The disk cartridge recited in claim 2 wherein said first and second opposed ramps are defined by a first ramp member having first and second opposing ramp surfaces, and a second ramp member having corresponding first and second opposing ramp surfaces, the first and second ramp members being situated on opposite sides of the head access opening of said disk cartridge.

* * * * *